US008783442B2

(12) United States Patent
Schroeder

(10) Patent No.: US 8,783,442 B2
(45) Date of Patent: Jul. 22, 2014

(54) MELTING FURNACE SYSTEM

(71) Applicant: Honda Motor Co., Ltd., Tokyo (JP)

(72) Inventor: Karl J. Schroeder, Columbus Grove, OH (US)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 13/681,981

(22) Filed: Nov. 20, 2012

(65) Prior Publication Data

US 2014/0138214 A1 May 22, 2014

(51) Int. Cl.
*B65G 57/24* (2006.01)
*F27B 3/18* (2006.01)

(52) U.S. Cl.
USPC ..................... 198/468.8; 198/474.1; 198/797; 414/796.7

(58) Field of Classification Search
USPC .................. 198/468.8, 474.1, 797; 414/796.7
See application file for complete search history.

(56) References Cited

U.S. PATENT DOCUMENTS 1,430,397 A * 9/1922 Moore .......................... 414/191
2,612,275 A 9/1952 Chapman
2,869,739 A 1/1959 Davis
3,010,589 A 11/1961 Davis
3,356,231 A 12/1967 Chambran
3,554,388 A 1/1971 Thompson
4,036,350 A * 7/1977 Jones ......................... 198/418.3
4,581,063 A * 4/1986 Oyabu et al. ..................... 75/686
4,657,467 A * 4/1987 Ransohoff et al. ............ 414/419
5,269,472 A * 12/1993 Koenig ........................... 241/33
6,334,975 B1 * 1/2002 Yokote et al. ................... 266/94
2004/0081543 A1 * 4/2004 Brown ....................... 414/796.8

FOREIGN PATENT DOCUMENTS

JP 2122195 5/1990

* cited by examiner

*Primary Examiner* — Ramya Burgess
*Assistant Examiner* — Thomas Randazzo
(74) *Attorney, Agent, or Firm* — Rankin, Hill & Clark LLP

(57) ABSTRACT

A melting furnace system includes a conveyor for moving a stack of ingots toward an ingot melting station. The conveyor has a platform and a raised part extending from the platform for engaging an underside of the stack. The conveyor automatically transfers the stack to a bucket located at a downstream end of the conveyor. The bucket includes a bottom wall, a back wall and a pair of sidewalls, and is sized to receive the stack of ingots. The bottom wall of the bucket is configured to receive the raised part of the conveyor such that the stack is initially positioned above the bottom wall of the bucket via the raised part. A carriage provided at the downstream end of the conveyor engages the bucket and includes a lifting mechanism for raising the bucket together with the stack of ingots toward the ingot melting station.

20 Claims, 6 Drawing Sheets

MELTING FURNACE SYSTEM

BACKGROUND

Exemplary embodiments herein generally relate to a melting furnace system, and, more particularly, to a quiet bucket charge for a melting furnace system.

In the casting industry, a metal object is created from the solidification of molten metal in a mold that defines the shape of the object. The metal typically arrives at a casting facility in the form of solid metal bars, generally referred to as ingots. A melting furnace utilizes the ingot bars as its charge material. The ingots generally arrive in a bundle arrangement (e.g., stacked on a palette and secured thereto by a metal banding or the like). The ingots have to be removed from the stack and then carried to a hearth or furnace where the ingots are heated to the molten state required for injection into the mold. When a melting system is employed at a casting facility, the stack can be loaded automatically where it is either broken up or dumped into a bucket via a conveyor, which can require additional equipment and can cause excessive noise. It can also be de-stacked and dropped into a bucket, which again requires extra equipment, high maintenance and can cause excessive noise. The stack of ingots can also be loaded manually (e.g., via a tow motor) into a bucket that requires a manned process. The bucket then drops the ingots into a furnace where the ingots are heated. As the ingots melt, the metal trickles into a bath, where a ladle dips out an amount of the molten metal for injection into a mold. The problems with the current automatic loading methods are the additional equipment that must be purchased, downtime from the extra equipment and associated spare parts costs, and noise to the environment. Further, with the known loading methods, the operator of the casting equipment oftentimes has to stop the equipment, while ingots are being loaded, for example on the conveyor of the melting furnace system. Accordingly, the production of the metal objects can be delayed.

BRIEF DESCRIPTION

In accordance with one aspect, a melting furnace system comprises a conveyor for moving a stack of ingots toward an ingot melting station. The conveyor includes a platform and a raised part extending from the platform for engaging an underside of the stack of ingots. The conveyor is configured to automatically transfer the stack of ingots to a bucket located at a downstream end of the conveyor. The bucket includes a bottom wall, a back wall and a pair of sidewalls. The bucket is sized to receive the stack of ingots. The bottom wall of the bucket is configured to receive the raised part of the conveyor such that the stack of ingots is initially positioned above the bottom wall of the bucket via the raised part thereby reducing noise associated with the loading of the stack of ingots in the bucket. A carriage provided at the downstream end of the conveyor engages the bucket and includes a lifting mechanism for raising the bucket together with the stack of ingots toward the ingot melting station.

In accordance with another aspect, a melting furnace system comprises a conveyor for moving a stack of ingots toward an ingot melting station. The conveyor includes a platform and a pair of spaced ribs extending from the platform for engaging the stack of ingots. The conveyor configured to automatically transfer the stack of ingots toward a bucket located at a downstream end of the conveyor. The bucket is intertwined with the conveyor and sized to receive the stack of ingots. The pair of spaced, parallel ribs of the conveyor initially positions the stack of ingots above a bottom wall of the bucket. At least one sensing device is associated with the bucket and is adapted to detect whether the bucket is in position for receipt of the stack of ingots from the conveyor and whether the stack of ingots is received in the bucket.

In accordance with yet another aspect, a method for automatically transferring a stack of ingots to an ingot melting station of a melting furnace system comprises positioning the stack of ingots on at least one rib extending from a movable platform of a conveyor; locating a bucket at a downstream end of the conveyor, the bucket being sized to receive the stack of ingots; intertwining the bucket and the conveyor by providing a bottom wall of the bucket with at least one elongated channel and positioning the at least one rib of the conveyor within the at least one channel; positioning an inner surface of the bottom wall below an engaging surface of the at least one rib of the conveyor thereby allowing the stack of ingots to be automatically delivered into the bucket without directly engaging the inner surface of the bottom wall; and raising the bucket together with the stack of ingots toward the ingot melting station.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary melting furnace system disclosed herein are merely terms of art that may vary from one manufacturer to another and should not be deemed to limit the present disclosure.

Figure 1:
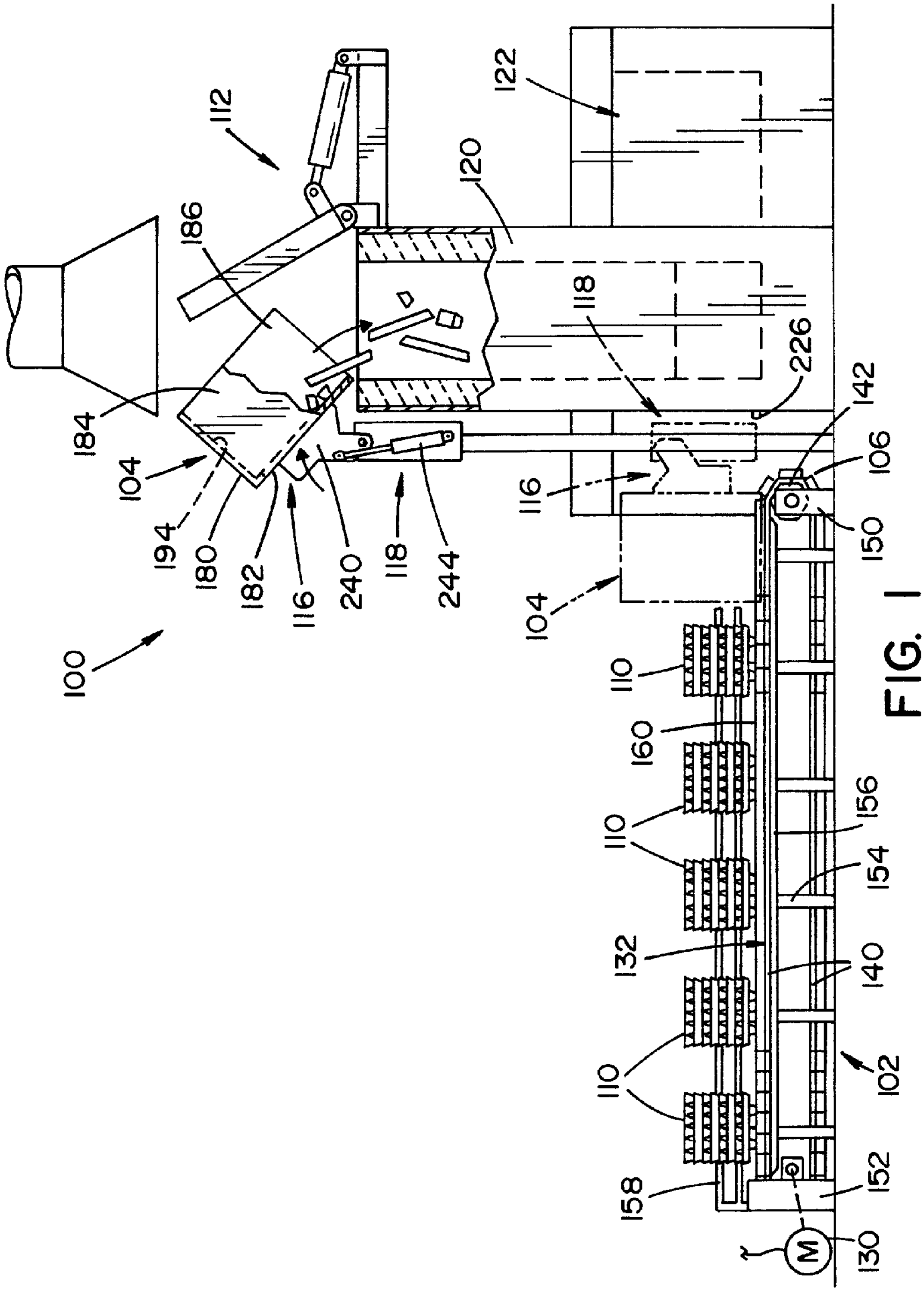
FIG. 1 is a side schematic view of a melting furnace system including an exemplary conveyor for delivering stacks of ingots to an exemplary bucket, and a lifting mechanism for raising the bucket together with the stack of ingots to a ingot melting station.
Figure 2:
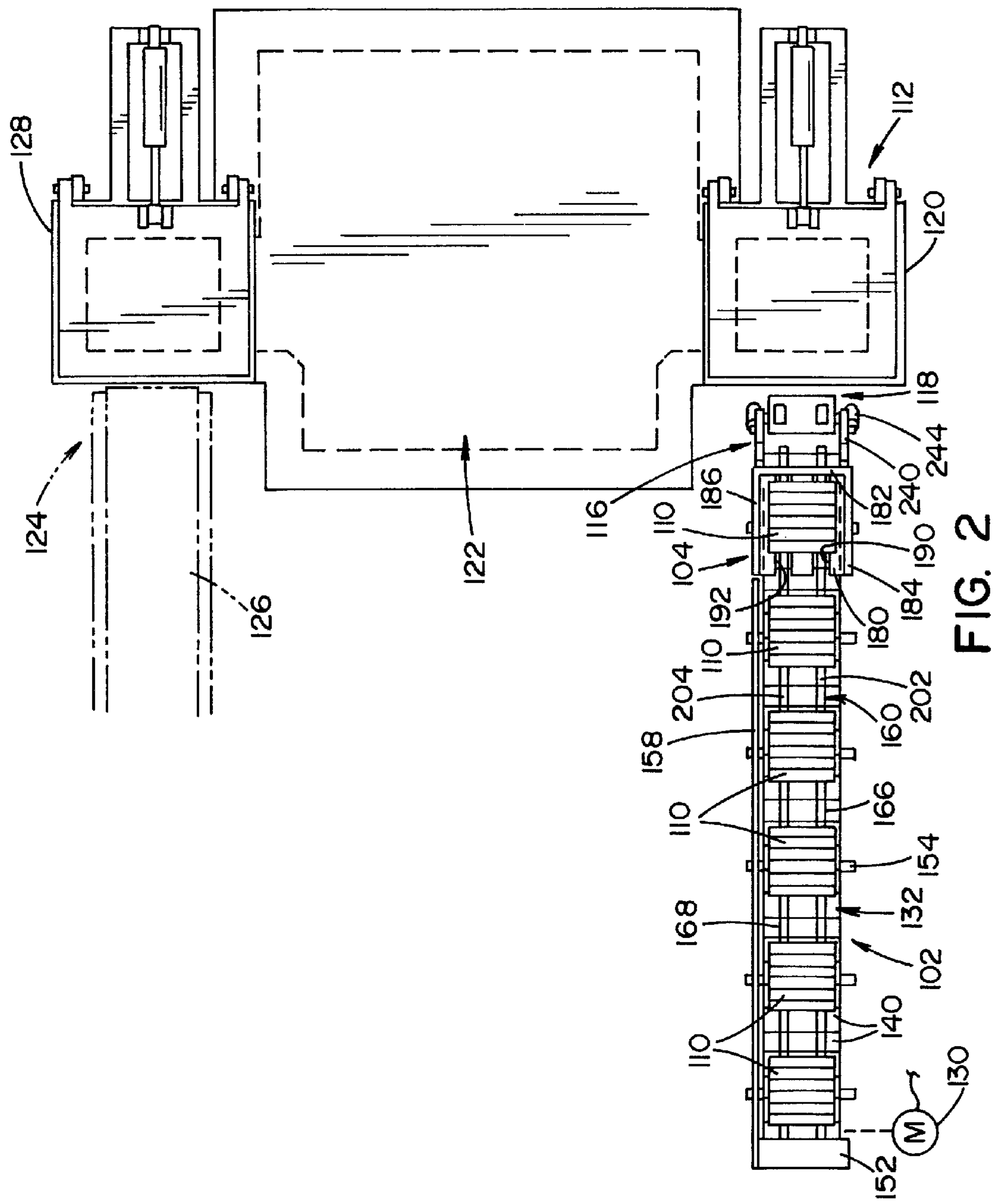
FIG. 2 is a top plan view of the melting furnace system of FIG. 1.

Referring now to the drawings, wherein like numerals refer to like parts throughout the several views, FIGS. 1 and 2 illustrate a melting furnace system 100 including an exemplary horizontal conveyor 102 and an exemplary bucket 104 located at a downstream end 106 of the conveyor, according to the present disclosure. The conveyor 102 is adapted to automatically and sequentially move stacks of ingots 110 (i.e., the charge material) toward an ingot melting station 112. Each stack of ingots 110 generally includes seven to nine rows of ingots with about six ingots per row. The conveyor 102 is operative to automatically transfer each stack of ingots to the bucket 104, which is sized to receive the stacks of ingots 110. A vertical bucket conveyor or carriage 116 is provided at the downstream end 106 of the conveyor 102. The carriage 116 is operable to engage the bucket 104 and includes a vertical charging unit or lifting mechanism 118 operable to raise the bucket together with one of the stacks of ingots to a predetermined position where the stack of ingots 110 is dumped or charged into a melting furnace stack 120 of the ingot melting station 112. This allows the entire stack of ingots 110 to be automatically charged in the ingot melting station 112 as a single load. The stack 120 can be lined with a high strength lining to resist wear abrasion and impact due to the movement of the charge material, and can be provided with a detecting device for sensing the level of charge material in the stack 120. The melting furnace system 100 can further include a hearth section 122 and a scrap material return section 124 including a scrap conveyor 126 and a furnace stack 128 having a carriage and lifting mechanism similar to the carriage 116 and lifting mechanism 118 for lifting a bucket (not shown) having casting debris therein and delivering the debris back to the hearth section 122.

The conveyor 102 can include a motor 130 for rotationally moving a floor or platform 132 toward the bucket 104. The platform 132 can be formed of a plurality of interconnected slats or plates 140 that are operably engaged by a pair of rollers (only downstream roller 142 is shown). The motor 130 can be operably connected to the upstream roller for controlling the speed of the conveyor 102, and motor can be in signal communication with a controller (not shown), thereby allowing the speed of the conveyor to be adjusted so that each stack of ingots 110 is not affected by movement toward the bucket 104. The motor 130 can also have an independent remote disconnect thereby allowing for maintenance of the conveyor 112 without stopping the entire melting furnace system 100, and can have an overload detector to prevent damage to the system. The conveyor 102 can also be provided with a detector (not shown) adapted to sense a material overrun at the conveyor, and an indicator (not shown), such as an alarm, for alerting an operator of the same. It should be appreciated that the alarm should have the ability to reset without ceasing the automatic operation of the delivery of the stacks of ingots 110 to the melting furnace stack 120. It should be also appreciated that the plates 140 can be connected to a conveyor chain which is driven by the motor 130. With this configuration, a drive sprocket can be provided on a drive shaft of the motor 130, a conveyor drive sprocket can be provided on the upstream roller, and a drive chain can be operably engaged by the drive sprockets.

As depicted, the conveyor 102 is sized to receive six stacks of ingots 110; although, it should be appreciated that the size of the conveyor can be adjusted depending on the constraints associated with the footprint or layout for the melting furnace system 100. The downstream roller 142 can be rotatably mounted on a downstream support 150 and the upstream roller can rotatably mounted on an upstream support 152; although, alternative manners for mounting the each of the downstream and upstream rollers are contemplated as long as the conveyor 102 is rigid and robust and maintenance can be easily performed. A plurality of support posts 154 can be provided between the supports 150, 152, each of the support posts 154 being connected to a horizontal support 156. The horizontal support 156 can serve as a supporting surface for the plates 140. A backrest 158 can be connected to one of the plurality of support posts 154 and the horizontal support 156 the conveyor and extends above the platform 132. The backrest 158 can ensure that each stack of ingots 110 is properly aligned on the platform 132 when it is loaded onto the conveyor 102. Catch pans (not shown) can also be provided at downstream and upstream locations of the conveyor 102 for the collection of scrap bandings (which can be used to secure the ingots in the stack) and tags associated with the stacks of ingots 110. The conveyor 102 is designed to allow the bands to fall through to the catch pans while preventing the ingots from wedging into the conveyor.

With reference now to FIGS. 3-6, the platform 132 of the conveyor 102 has a raised part 160 extending from a surface 162 of the platform for engaging an underside of the stack of ingots 110. In the depicted embodiment, the raised part 160 of the conveyor 102 is defined by at least one rib located on each of the plates 140. As shown, the at least one rib includes a pair of spaced, parallel ribs 166, 168 located on each of the plates 140. The corresponding ribs 166, 168 of the plates 140 are aligned so that the arrayed ribs 166, 168 define continuous support surfaces for the stacks of ingots 110. Each of the ribs 166, 168 provided on each of the plates 140 can be rectangular in longitudinal cross-section and can have a length substantially equal to a length of the plates 140. Further, the ribs 166, 168 have a width sufficient to support the stacks of ingots 110 provided thereon, and the ribs 166, 168 have a height to initially position each stack of ingots 110 above a bottom wall 180 of the bucket 104 to allow for proper nesting of the stack of ingots in the bucket, as will be described in greater detail below.

Figure 4:
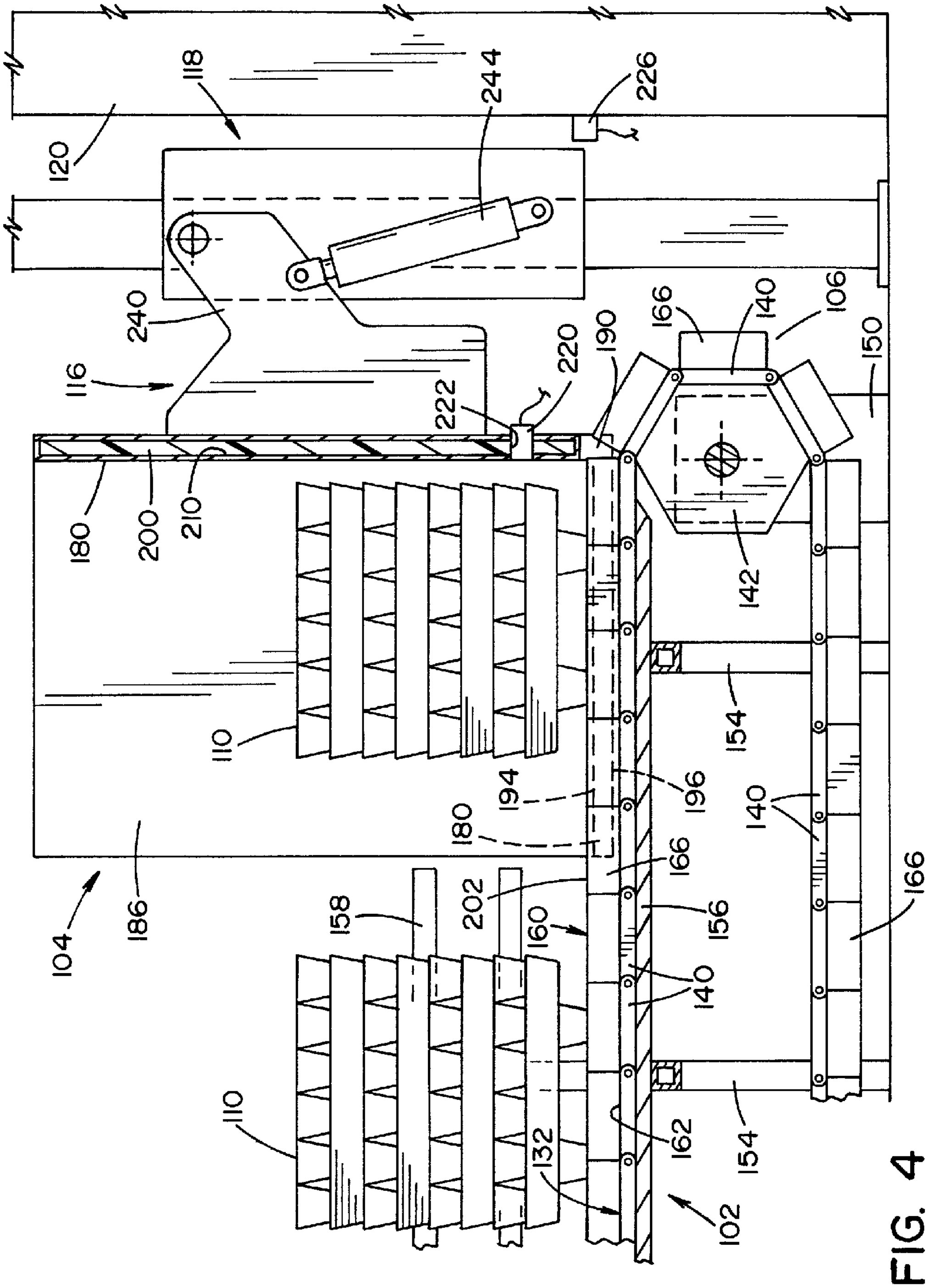
FIG. 4 is a partial enlarged view of FIG. 1 showing the stack of ingots received in the bucket.
Figure 5:
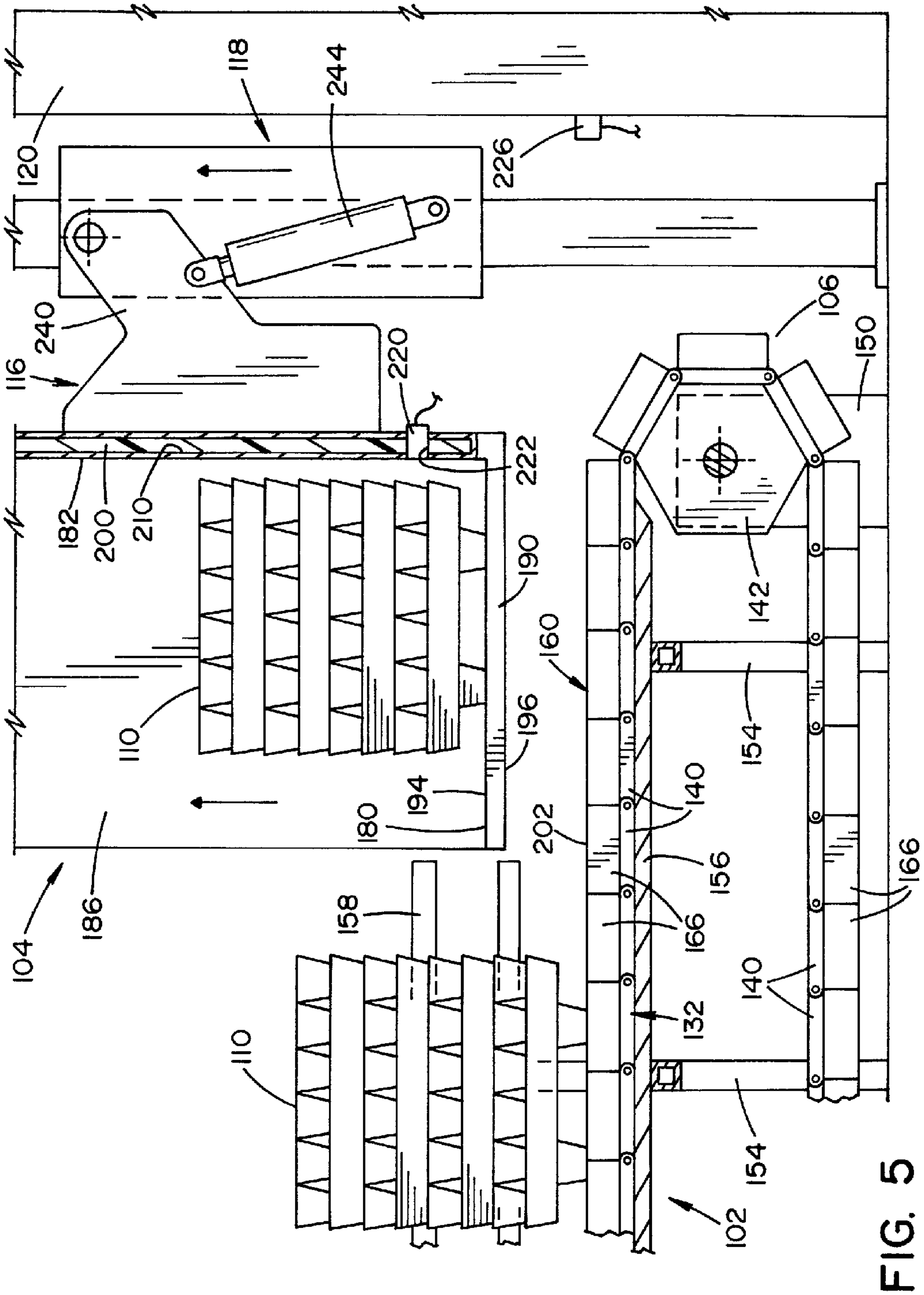
FIG. 5 is a partial enlarged view of FIG. 1 showing the lifting mechanism lifting the bucket together with the stack of ingots.
Figure 6:
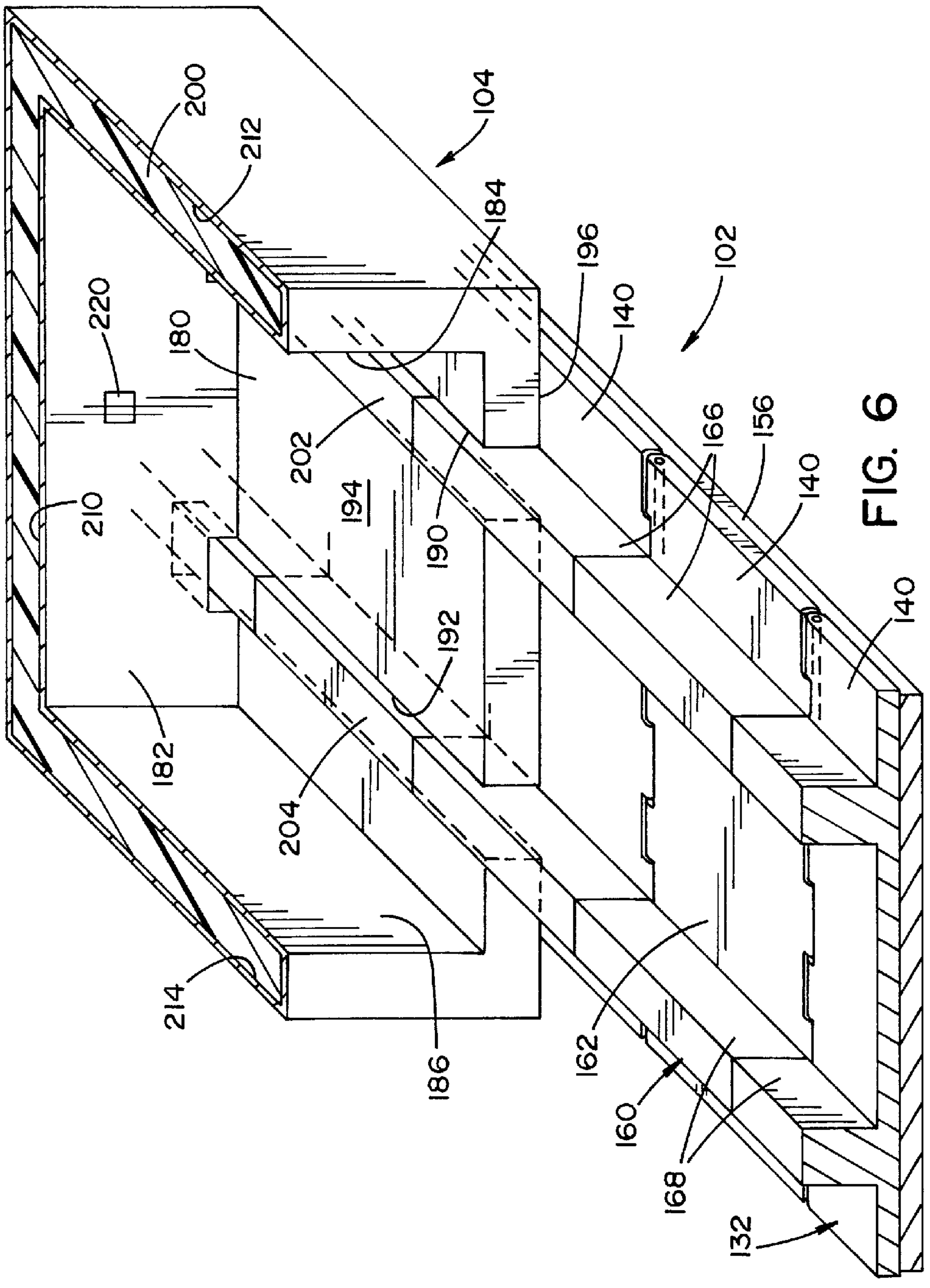
FIG. 6 is a partial cross-sectional view of the exemplary conveyor and the exemplary bucket of the melting furnace system of FIG. 1.

The bucket 104 includes the bottom wall 180, a back wall 182 and a pair of sidewalls 184, 186, and is sized to completely receive therein the stack of ingots 110 (see FIGS. 4 and 5). The walls 180, 182, 184, 186 can be integrally formed to define a unitary bucket 104; although, this is not required. As shown, the bottom wall 180 of the bucket 104 is configured to receive the raised part 160 of the conveyor 102 such that the stack of ingots 110 is initially positioned above the bottom wall 180 of the bucket 104 via the raised part 160. More particularly, the bottom wall 180 of the bucket 104 includes an elongated channel for receiving the raised part 160 of the conveyor. With the raised part 160 of the conveyor 102 being defined by at least one rib, such as the pair of spaced, parallel ribs 166, 168, the bottom wall 180 includes at least one elongated channel, for example, a pair of spaced elongated channels 190, 192 for receiving the pair of spaced ribs 166, 168, respectively, of the conveyor 102. Thus, the bucket 104 is intertwined with the conveyor 102, and the pair of spaced, parallel ribs 166, 168 of the conveyor initially positions the stack of ingots 110 above the bottom wall 180 of the bucket. As best depicted in FIGS. 4 and 6, the channels 190, 192 can extend the entire length of the bottom wall 180, and the pair of spaced ribs 166, 168 is sized to project a predetermined distance above an inner surface 194 of the bottom wall of the bucket to allow for proper nesting of the stack of ingots 110 in the bucket. This positions the inner surface 194 of the bottom wall 180 below a respective engaging upper surface 202, 204 of each of the ribs 166, 168 of the conveyor 102 thereby allowing the stack of ingots 110 to be automatically delivered into the bucket 104 without directly engaging the inner surface 194 of the bottom wall 180. This initial positioning of the stack of ingots 110 in the bucket 104 reduces noise associated with the loading of the stack of ingots 110 in the bucket 104. The bucket 104 is also located above the conveyor 102 such that an outer surface 196 of the bottom wall 180 of the bucket 104 is positioned above the platform 132 of the conveyor.

As indicated previously, the bucket 104 is configured to reduce noise associated with the stack of ingots 110 being automatically received in the bucket 104 via the conveyor 102. In addition to the positioning of the bucket 104 relative to the platform 132 and its corresponding raised part 160, the bucket 104 can be at least partially formed of a sound or noise deadening material 200. According to one aspect, at least one of the back wall 182 and sidewalls 184, 186 defines a cavity having the noise deadening material 200 provided therein. In the illustrated embodiment, the back wall 182 defines a cavity 210 and each of the respective sidewalls 184, 186 defines a cavity 212, 214, and each cavity 210, 212, 214 has the noise deadening material 200 provided therein. Further, each cavity 210, 212, 214 can extend the entire dimension of the respective back wall 182 and sidewalls 184, 186; although, with the size of the bucket 104 being significantly larger than the stack of ingots 110 received therein, this is not required. According to another aspect, the back wall 182 and sidewalls 184, 186 can have a tubular design (e.g., tubular members filled with the noise deadening material provided on the walls) for noise reduction.

With reference again to FIGS. 3-5, the melting furnace system 100 can further include at least one sensing device 220 associated with the bucket 104 and adapted to detect that the bucket 104 is in proper position at the conveyor downstream end 106 for receipt of the stack of ingots 110 from the conveyor 102 and that the stack of ingots 110 is completely received in the bucket. In the depicted embodiment, the sensing device 220 is located in an opening 222 provided in a lower portion of the back wall 180, which allows the sensing device to detect proximity of the stack of ingots 110 to the back wall 180. Although, it should be appreciated that the sensing device 220 can be located elsewhere on the bucket 104, as long as the position of the sensing device 220 ensures proper detection of the position of the stack of ingots 110 in the bucket 104. The melting furnace system 100 can further include at least one second sensing device 226 associated with the conveyor 102 and adapted to detect when the stack of ingots 110 is removed from the conveyer 102 via the raising of the bucket 104 by the carriage 116. As shown, the second sensing device 226 is located on a lower portion of the melting furnace stack 120; however, alternative locations for the second sensing device 226 are contemplated. Each sensing device 220, 226 can be in signal communication with a controller (not shown) which can alert an operator of a nonconforming position of a stack of ingots 110 and/or the bucket 104. The sensing device 220 and second sensing device 226 can be an optical sensor, a proximity sensor or the like. Additionally, a banding detector (not shown) can be provided to detect whether a banding associated with each stack of ingots 110 is removed prior to the stack of ingots being positioned in the bucket 104. The banding detector is adapted to accommodate the variations between the stacks of ingots 110. An overfill detector (not shown) can also be provided for bucket overflow.

Figure 3:
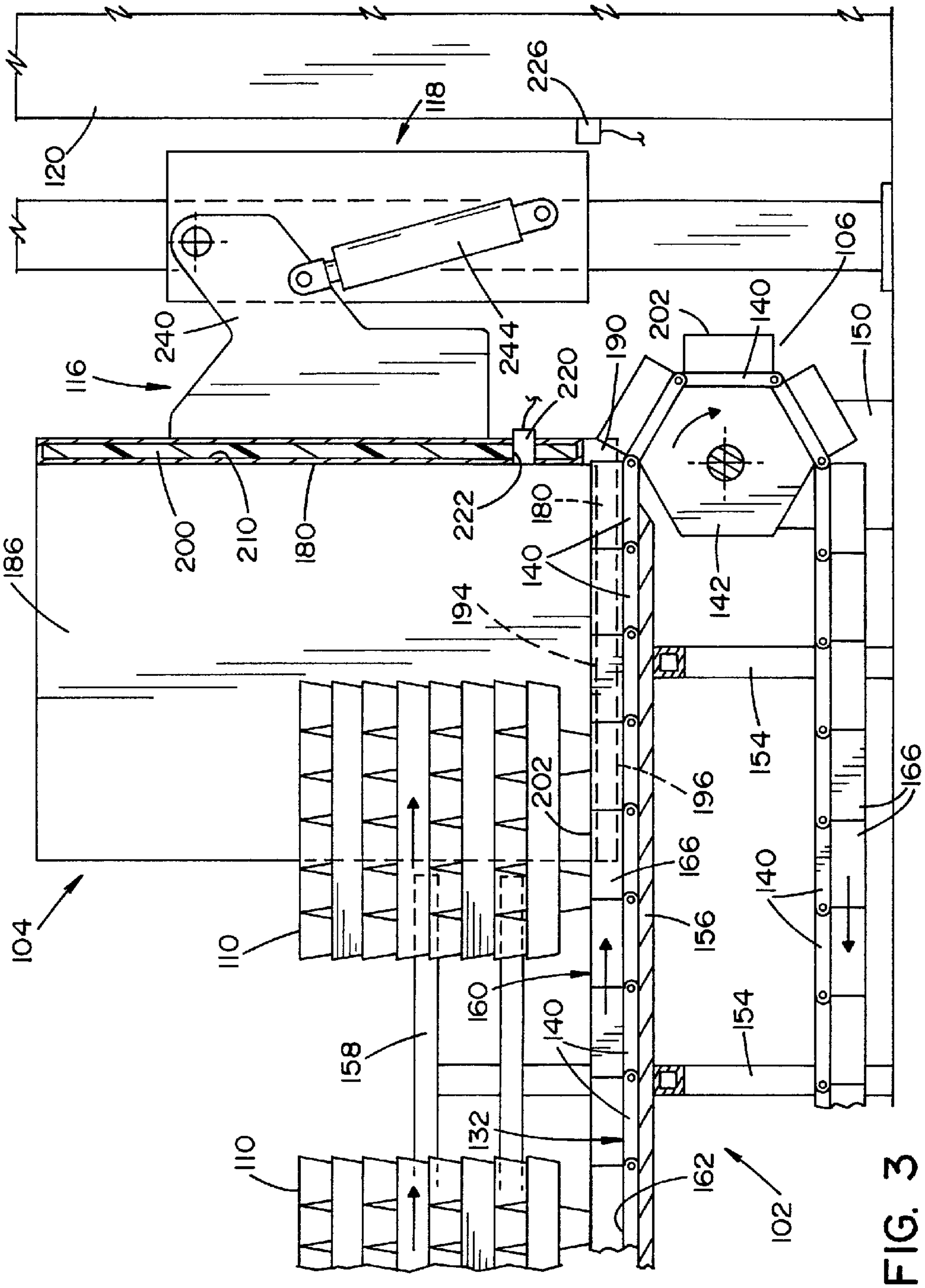
FIG. 3 is a partial enlarged view of FIG. 1 showing the conveyor delivering a stack of ingots to the bucket.

With continued reference to FIGS. 3-5, the melting furnace system 100 is operable to sequentially receive the stack of ingots 110 and have the entire stack of ingots automatically charged in the ingot melting station 112 as a single load. The back wall 180 of the bucket 104 is connected to the carriage 116, and the carriage can include a pair of arms (only arm 240 is shown) that connect the carriage 116 to the lifting mechanism 118. At least one piston 244 further connects the arm 240 to the lifting mechanism 118. The piston 244 is operable to tilt the bucket 104 when the bucket is at a predetermined location on the melting furnace stack 120 to discharge the entire stack of ingots 110 from the bucket and into the ingot melting station 112. The lifting mechanism 118 may operate, for example via hydraulics, pneumatics, or electromechanical methods known in the art. The lifting mechanism 118 can also be provided with limit switches for lifting and lowing directions and over travel limits for overrun detection. When the bucket 104 returns to its proper position above the downstream end 106 of the conveyor 102, the conveyor automatically advances the next stack of ingots toward the bucket 104. Thus, the movements of the conveyor 102 and lifting mechanism 118 are synchronized to allow optimal loading and achieve the proper rate of melting the charge material. Mechanical stops can be also provided to maintain the bucket 104 in position relative to the conveyor 102, and redundant limit switches can be implemented to guarantee bucket position.

The present disclosure also provides a method for automatically transferring the stacks of ingots 110 to the ingot melting station 112 of the melting furnace system 100. The method generally comprises positioning each stack of ingots 110 on at least one rib, such as the pair of spaced, parallel ribs 166, 168 extending from the movable platform 132 of the conveyor 102; locating the bucket 104 sized to receive the stack of ingots 110 at the downstream end 106 of the conveyor 102; intertwining the bucket 104 and the conveyor 102 by providing the bottom wall 180 of the bucket with at least one channel, such as the pair of elongated channels 190, 192 and positioning the pair of ribs 166, 168 of the conveyor within the channels; positioning the inner surface 194 of the bottom wall 180 below the engaging surface 202, 204 of each of the respective ribs 166, 168 of the conveyor thereby allowing the stack of ingots 110 to be automatically delivered into the bucket 104 without directly engaging the inner surface 194 of the bottom wall 180; and raising the bucket 104 together with the stack of ingots 110 toward the ingot melting station 112. The method further includes automatically charging the entire stack of ingots in the ingot melting station as a single load.

As is evident from the foregoing, according to one embodiment, the bucket 104 includes the forked bottom wall 180 defined by the channels 190, 192 that can be positioned slightly above the ingot staging conveyor 102. The conveyor 102 has the raised ribs 166, 168 on the slats 140 that allow the ingot bundles 110 to be set on top of the ribs. The bucket forks 190, 192 mesh in between the ribs 166, 168 of the conveyor 102. This enables the stack of ingots 110 to quietly travel on the conveyor to a position directly above the bottom wall 180 and within the bucket. After the stack of ingots 110 is confirmed in by the sensing device 220, the bucket 104 can be raised by the carriage 116 and lifting mechanism 118 and the entirety of the ingot stack 110 can be charged as a whole unit. Thus, the respective designs of the conveyor 102 and bucket 104 reduce the excessive noise created by the dumping of the ingots (e.g., less than 80 dB's, 1 meter from the source), and also simplify the process and eliminate conveyor equipment. Further charge cycle time is reduced to increase melting capacity.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A melting furnace system comprising:

a conveyor for moving a stack of ingots toward an ingot melting station, the conveyor includes a platform and a raised part extending from the platform for engaging an underside of the stack of ingots, the conveyor configured to automatically transfer the stack of ingots to a bucket located at a downstream end of the conveyor, the bucket includes a bottom wall, a back wall and a pair of sidewalls, the bucket is sized to receive the stack of ingots, the bottom wall of the bucket is configured to receive the raised part of the conveyor such that the stack of ingots is initially positioned above the bottom wall of the bucket via the raised part thereby reducing noise associated with the loading of the stack of ingots in the bucket; and a carriage provided at the downstream end of the conveyor, the carriage engages the bucket and includes a lifting mechanism for raising the bucket together with the stack of ingots toward the ingot melting station.

2. The melting furnace system of claim 1, wherein the bucket is at least partially formed of a noise deadening material to reduce noise associated with the stack of ingots being automatically received in the bucket via the conveyor.

3. The melting furnace system of claim 2, wherein at least one of the back wall and sidewall defines a cavity having the noise deadening material provided therein.

4. The melting furnace system of claim 1, wherein an entirety of the stack of ingots is automatically charged in the ingot melting station as a single load.

5. The melting furnace system of claim 1, further including at least one sensing device associated with the bucket and adapted to detect that the bucket is in position for receipt of the stack of ingots from the conveyor.

6. The melting furnace system of claim 5, wherein the at least one sensing device is adapted to detect that the stack of ingots is completely received in the bucket.

7. The melting furnace system of claim 5, further including at least one second sensing device associated with the conveyor and adapted to detect when the stack of ingots is removed from the conveyer via the raising of the bucket by the carriage.

8. The melting furnace system of claim 1, wherein the bottom wall of the bucket includes an elongated channel for receiving the raised part of the conveyor.

9. The melting furnace system of claim 1, wherein the raised part of the conveyor is defined by a pair of spaced, parallel ribs.

10. The melting furnace system of claim 9, wherein the bottom wall of the bucket includes a pair of spaced elongated channels for receiving the pair of spaced ribs of the conveyor.

11. The melting furnace system of claim 10, wherein the pair of spaced ribs of the conveyor is sized to project a predetermined distance above an inner surface of the bottom wall of the bucket to allow for proper nesting of the stack of ingots in the bucket.

12. The melting furnace system of claim 11, wherein an outer surface of the bottom wall of the bucket is positioned above the platform of the conveyor.

13. A melting furnace system comprising:

a conveyor for moving a stack of ingots toward an ingot melting station, the conveyor includes a platform and a pair of spaced ribs extending from the platform for engaging the stack of ingots, the conveyor configured to automatically transfer the stack of ingots toward a bucket located at a downstream end of the conveyor, the bucket is intertwined with the conveyor and is sized to receive the stack of ingots, the pair of spaced, parallel ribs of the conveyor initially positions the stack of ingots above a bottom wall of the bucket; and at least one sensing device associated with the bucket and adapted to detect whether the bucket is in position for receipt of the stack of ingots from the conveyor.

14. The melting furnace system of claim 13, wherein the bucket is a three-sided bucket and is at least partially formed of a noise deadening material to reduce noise associated with the stack of ingots being automatically received in the bucket via the conveyor.

15. The melting furnace system of claim 13, wherein an entirety of the stack of ingots is automatically charged in the ingot melting station as a single load.

16. The melting furnace system of claim 13, wherein the bottom wall of the bucket includes a pair of spaced elongated channels for receiving the pair of spaced ribs of the conveyor, the pair of spaced ribs of the conveyor is sized to project a predetermined distance above an inner surface of the bottom wall of the bucket to allow for proper nesting of the stack of ingots in the bucket.

17. The melting furnace system of claim 13, wherein the bottom wall defines a depth of the bucket and each of the channels extend approximately the entire depth of the bucket.

18. The melting furnace system of claim 13, further including a carriage provided at the downstream end of the conveyor, the carriage including a lifting mechanism for raising the bucket together with the stack of ingots to the ingot melting station.

19. A method for automatically transferring a stack of ingots to an ingot melting station of a melting furnace system, comprising:

positioning the stack of ingots on at least one rib extending from a movable platform of a conveyor;

locating a bucket at a downstream end of the conveyor, the bucket is sized to receive the stack of ingots;

intertwining the bucket and the conveyor by providing a bottom wall of the bucket with at least one elongated channel and positioning the at least one rib of the conveyor within the at least one channel;

positioning an inner surface of the bottom wall below an engaging surface of the at least one rib of the conveyor thereby allowing the stack of ingots to be automatically delivered into the bucket without directly engaging the inner surface of the bottom wall; and raising the bucket together with the stack of ingots toward the ingot melting station.

20. The method of claim 19, further comprising automatically charging an entirety of the stack of ingots in the ingot melting station as a single load.

* * * * *